United States Patent
Engel et al.

(10) Patent No.: US 11,243,156 B2
(45) Date of Patent: Feb. 8, 2022

(54) DETERMINING INTERFACIAL TENSION FOR FLUID-FLUID-SOLID ENVIRONMENTS

(71) Applicant: International Business Machines Corporation, Armonk, NY (US)

(72) Inventors: Michael Engel, Rio de Janeiro (BR); Filipe Viana Ferreira, Rio de Janeiro (BR); Rodrigo Neumann Barros Ferreira, Rio de Janeiro (BR); Ronaldo Giro, Rio de Janeiro (BR); Mathias Steiner, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 90 days.

(21) Appl. No.: 16/923,180

(22) Filed: Jul. 8, 2020

(65) Prior Publication Data
US 2022/0011212 A1    Jan. 13, 2022

(51) Int. Cl.
*G01N 13/02* (2006.01)
*G01Q 60/28* (2010.01)

(52) U.S. Cl.
CPC ............. *G01N 13/02* (2013.01); *G01Q 60/28* (2013.01)

(58) Field of Classification Search
CPC .............................. G01N 13/02; G01Q 60/28
See application file for complete search history.

(56) References Cited

U.S. PATENT DOCUMENTS

| | | |
|---|---|---|
| 4,250,741 A | 2/1981 | Scriven et al. |
| 4,416,148 A | 11/1983 | Klus et al. |
| 4,697,451 A | 10/1987 | Matteson |

(Continued)

FOREIGN PATENT DOCUMENTS

| | | |
|---|---|---|
| DE | 4412405 A1 | 10/1995 |
| GB | 2513310 B | 9/2015 |

(Continued)

OTHER PUBLICATIONS

Mahady et al., "A volume of fluid method for simulating fluid/fluid interfaces in contact with solid boundaries," Journal of Computational Physics 294, Apr. 1, 2015, pp. 243-257.

(Continued)

*Primary Examiner* — Brooke Purinton
(74) *Attorney, Agent, or Firm* — Cantor Colburn LLP; Joseph Petrokaitis

(57) ABSTRACT

Aspects of the invention include determining, by a first AFM tip, a first snap-off force of a solid surface immersed in a first fluid, determining, by a second AFM tip, a second snap-off force, determining, by a third AFM tip, a third snap-off force, determining, by the first AFM tip, a fourth snap-off force of a droplet of the first fluid immersed in the second fluid on the solid surface, determining, by the second AFM tip, a fifth snap-off force, determining, by the third AFM tip, a sixth snap-off force, determining a first capillary force for first AFM tip and first droplet based on first snap-off force and fourth snap-off force, determining a second capillary force for second AFM tip and first droplet and a third capillary force for third AFM tip and first droplet, and determining interfacial tension between first fluid and second fluid based on the capillary forces.

20 Claims, 9 Drawing Sheets

(56) References Cited

U.S. PATENT DOCUMENTS

| | | | |
|---|---|---|---|
| 5,542,289 A * | 8/1996 | Hool | G01N 13/02 324/691 |
| 5,615,276 A | 3/1997 | Lin et al. | |
| 6,119,511 A * | 9/2000 | Christian | G01N 13/02 73/64.48 |
| 7,224,470 B2 | 5/2007 | Vaux et al. | |
| 8,474,306 B1 | 7/2013 | Behroozi | |
| 10,031,984 B2 | 7/2018 | Kazama | |
| 2006/0288761 A1* | 12/2006 | Kinnunen | G01N 13/02 73/64.48 |
| 2016/0033383 A1 | 2/2016 | Grinstaff et al. | |

FOREIGN PATENT DOCUMENTS

| | | | |
|---|---|---|---|
| RU | 1097048 C | 10/1992 | |
| WO | WO-2018134479 A1 * | 7/2018 | G01L 5/162 |

OTHER PUBLICATIONS

Rekhaviashvili et al., "Influence of the Size-Dependent Surface Tension of a Liquid Film on a Capillary Force in an Atomic Force Microscope," ISSN 0021-3640, JETP Letters, 2008, vol. 88, No. 11, pp. 772-776.

Wikipedia, "Surface tension," Wikipedia.org; URL: https://en.wikipedia.org/wiki/Surface_tension#Methods_of_measurement; Retrieved: Mar. 25, 2020; 22 pages.

Wikipedia, "Tensiometer (surface tension)," Wikipedia.org; URL: https://en.wikipedia.org/wiki/Tensiometer_(surface_tension); Retrieved: Mar. 25, 2020; 3 pages.

Yang et al., "Modeling the rupture of a capillary liquid bridge between a sphere and plane," The Royal Society of Chemistry, Soft Matter, Oct. 10, 2010, pp. 6178-6182.

* cited by examiner $$d = R(1 - \cos\alpha)$$

$$r_1 = \frac{h+d}{\cos(\theta_1 + \alpha) + \cos\theta_2}$$

$$r_2 = x_t = R\sin\alpha$$

$$\epsilon_1 = \frac{\pi}{2} - \theta_1 - \alpha$$

$$\epsilon_2 = a * \sin\left(\frac{h + R(1 - \cos\alpha)}{r_1} - \cos(\theta_1 + \alpha)\right)$$

$$\epsilon = \epsilon_1 + \epsilon_2$$

$$R_d = r_2 + r_1(\cos\epsilon_1 - \cos\epsilon_2)$$

$$x_0 = r_2 + r_1 \sin(\theta_1 + \alpha)$$

$$x_t = r_2$$

$$y_0 = h + d - r_1 \cos(\theta_1 + \alpha)$$

$$y_t = h + d$$

$$V = \int_0^{y_t} \pi x^2 dy - V_{spherical\ cap}$$

$$V = \pi\left\{r_1^2 y_t - \frac{r_1^3 \cos^3(\alpha + \theta_1)}{3} - \frac{r_1^3 \cos^3\theta_2}{3} + x_0^2 y_t - \frac{x_0 r_1^2}{2}\left[\sin(2(\alpha + \theta_1)) + \sin(2\theta_2) + 2\pi - 2(\alpha + \theta_1 + \theta_2)\right]\right\} - \frac{\pi R^3}{3}(1 - \cos\alpha)^2(2 + \cos\alpha)$$

FIG. 2

DETERMINING INTERFACIAL TENSION FOR FLUID-FLUID-SOLID ENVIRONMENTS

BACKGROUND

The present invention generally relates to interfacial tension, and more specifically, to determining interfacial tension in fluid-fluid-solid environments.

Interfacial tension refers to the reduction of surface area between two media in order to minimize interfacial energy. Interfacial tension is sometimes referred to as surface tension when referring to a liquid surrounded by a gas phase. The interfacial/surface tension (IFT) is typically obtained as a figure-of-merit for fluid-fluid integrations. A fluid includes any of a media in a liquid phase, gas phase, or plasma phase. Interfacial tension is generally measured at the macroscopic scale using a variation of a tensiometer. Typically, these measurements are performed where the surrounding medium is limited to a gaseous phase. That is to say, typical methods cannot measure oil droplets dispersed in water on a glass surface. Additionally, surface tension measurements are typically restricted to large size droplets.

SUMMARY

Embodiments of the present invention are directed to a method for determining interfacial tension in fluid-fluid-solid systems. A non-limiting example computer-implemented method includes determining, by operation of an atomic force microscope (AFM) comprising a first AFM tip having a first radius, a first snap-off force of a solid surface immersed in a first fluid, determining, by operation of the AFM comprising a second AFM tip having a second radius, a second snap-off force of the solid surface immersed in the first fluid, determining, by operation of the AFM comprising a third AFM tip having a third radius, a third snap-off force of the solid surface immersed in the first fluid, determining, by operation of the first AFM tip, a fourth snap-off force of a first droplet of the first fluid deposited on the solid surface, wherein the first droplet, the first AFM tip, and the solid surface are immersed in a second fluid, determining, by operation of the second AFM tip, a fifth snap-off force of the first droplet of the first fluid deposited on the solid surface, wherein the first droplet, the second AFM tip, and the solid surface are immersed in the second fluid, determining, by operation of the third AFM tip, a sixth snap-off force of the first droplet of the first fluid deposited on the solid surface, wherein the first droplet, the third AFM tip, and the solid surface are immersed in the second fluid, determining a first capillary force for the first AFM tip and the first droplet of the first fluid immersed in the second fluid based on the first snap-off force and the fourth snap-off force, determining a second capillary force for the second AFM tip and the first droplet of the first fluid immersed in the second fluid based on the second snap-off force and the fifth snap-off force, determining a third capillary force for the third AFM tip and the first droplet of the first fluid immersed in the second fluid based on the third snap-off force and the sixth snap-off force, and determining an interfacial tension between the first fluid and the second fluid based at least in part on the first capillary force, the second capillary force, and the third capillary force.

Embodiments of the present invention are directed to a system for determining interfacial tension in fluid-fluid-solid systems. A non-limiting example system includes an atomic force microscope (AFM) comprising a first AFM tip having a first radius, a second AFM tip having a second radius, a third AFM tip having a third radius, and a processing circuit configured to determine, by operation of the first AFM tip, a first snap-off force of a solid surface immersed in a first fluid, determine, by operation of the second AFM tip, a second snap-off force of the solid surface immersed in the first fluid, determine by operation of the third AFM tip, a third snap-off force of the solid surface immersed in the first fluid, determine, by operation of the first AFM tip, a fourth snap-off force of a first droplet of the first fluid deposited on the solid surface, wherein the first droplet, the first AFM tip, and the solid surface are immersed in a second fluid, determine, by operation of the second AFM tip, a fifth snap-off force of the first droplet of the first fluid deposited on the solid surface, wherein the first droplet, the second AFM tip, and the solid surface are immersed in the second fluid, determine, by operation of the third AFM tip, a sixth snap-off force of the first droplet of the first fluid deposited on the solid surface, wherein the first droplet, the third AFM tip, and the solid surface are immersed in the second fluid, determine a first capillary force for the first AFM tip radius and the first droplet of the first fluid immersed in the second fluid based on the first snap-off force and the fourth snap-off force, determine a second capillary force for the second AFM tip radius and the first droplet of the first fluid immersed in the second fluid based on the second snap-off force and the fifth snap-off force, determining a third capillary force for the third AFM tip radius and the first droplet of the first fluid immersed in the second fluid based on the third snap-off force and the sixth snap-off force, determine an interfacial tension between the first fluid and the second fluid based at least in part on the first capillary force, the second capillary force, and the third capillary force.

Embodiments of the present invention are directed to a method for determining interfacial tension in fluid-fluid-solid systems. A non-limiting example computer-implemented method includes determining, by operation of an atomic force microscope (AFM) comprising a planar AFM cantilever, a first snap-off force of a first spherical protrusion from a solid surface, wherein the AFM cantilever and the first spherical protrusion are immersed in a first fluid, and wherein the first spherical protrusion comprises a first radius, determining, by operation of the planar AFM cantilever, a second snap-off force of a second spherical protrusion from a solid surface, wherein the AFM cantilever and the second spherical protrusion are immersed in a first fluid, and wherein the second spherical protrusion comprises a second radius, determining, by operation of the planar AFM cantilever, a third snap-off force of a third spherical protrusion from a solid surface, wherein the AFM cantilever and the third spherical protrusion are immersed in a first fluid, and wherein the third spherical protrusion comprises a third radius, determining, by operation of the planar AFM cantilever, a fourth snap-off force of a droplet of the first fluid deposited on the first spherical protrusion from the solid surface, wherein the droplet, the AFM cantilever, and the first spherical protrusion are immersed in a second fluid, determining, by operation of the planar AFM cantilever, a fifth snap-off force of a droplet of a first fluid deposited on the second spherical protrusion from the solid surface, wherein the droplet, the AFM cantilever, and the second spherical protrusion are immersed in a second fluid, determining, by operation of the planar AFM cantilever, a sixth snap-off force of a droplet of a first fluid deposited on the third spherical protrusion from the solid surface, wherein the droplet, the AFM cantilever, and the third spherical protrusion are immersed in a second fluid, determining a first capillary force for the first spherical protrusion radius and the droplet of the first fluid immersed in the second fluid based on the first snap-off force and the fourth snap-off force, determining a second capillary force for the second spherical protrusion radius and the droplet of the first fluid immersed in the second fluid based on the second snap-off force and the fifth snap-off force, determining a third capillary force for the third spherical protrusion radius and the droplet of the first fluid immersed in the second fluid based on the third snap-off force and the sixth snap-off force, and determining an interfacial tension between the first fluid and second fluid based at least in part on the first capillary force, the second capillary force and the third capillary force.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 depicts a set of equations for calculations utilized for determining interfacial tension in fluid-fluid-solid systems according to one or more embodiments of the present invention;

Figure 1:
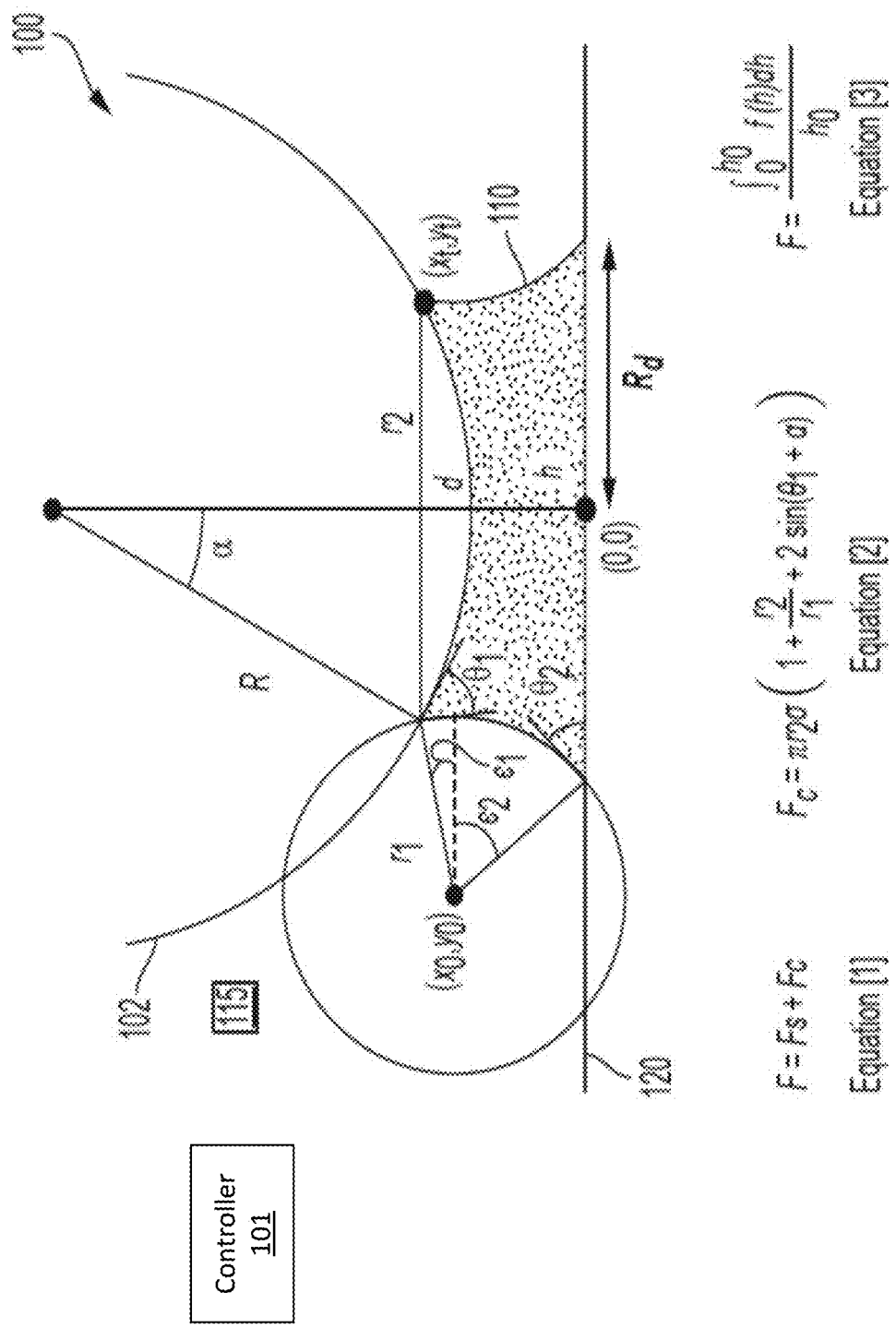
FIG. 1 depicts a schematic diagram of an atomic force microscope (AFM) tip in contact with a droplet of a sample fluid in contact with a solid surface while immersed in a second fluid according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for the quantitative determination of interfacial/surface tension in fluid-fluid-solid systems. As previously noted herein, interfacial tension refers to the reduction of surface area between two media in order to minimize interfacial energy. Interfacial tension is sometimes referred to as surface tension when referring to a liquid surrounded by a gas phase. The interfacial/surface tension (IFT) is typically obtained as a figure-of-merit for fluid-fluid integrations. A fluid includes any of a media in a liquid phase, gas phase, or plasma phase.

IFT is generally measured at the macroscopic scale using a variation of a tensiometer. Traditional techniques, however, have a number of drawbacks. One drawback is that the surrounding medium is, for almost all methods, limited to the gaseous phase. This does not allow for the measurement of oil droplets dispersed in water on a glass surface, for example. Another drawback is that traditional methods are restricted to large size droplets. IFT, typically, is relevant when determined at the micron or sub-micron scale. Another drawback is that measurements at the macroscale do not capture the scale dependency of IFT (e.g., Tolman length) that dominate at the micro/sub-micron scale. The Tolman length (also known as Tolman's delta) measures the extent by which the surface tension of a small fluid drop deviates from its planar value due to the molecular-scale interactions at the three-phase contact line. Another such limitation is that it is often assumed that the material of the AFM tip and the material of the solid surface are the same, which simplifies the equations involving the, in general, distinct contact angles between the fluid droplet and the AFM tip and between the fluid droplet and the solid surface.

Turning now to an overview of the aspects of the invention, one or more embodiments of the invention address the above-described shortcomings of the prior art by providing techniques for determining the IFT of a fluid immersed in another fluid on a solid surface where the droplet size of the fluid is in the micron or submicron size. This is performed utilizing an atomic force microscope (AFM) to measure the snap-off force required to snap the AFM tip off of a solid surface surrounded by a first fluid and the snap-off force of the fluid on the solid surface while the fluid is immersed in a second fluid. An AFM is a high-resolution type of scanning probe microscope with resolution in the range of fractions of a nanometer. The AFM operates a mechanical probe over a surface of a sample material (solid/fluid) and measures the deflection and motion of the cantilever as it contacts the sample material. Piezoelectric elements facilitate tiny but accurate and precise movements of the cantilever and tip which can later be utilized to determine characteristics of the sample material.

Turning now to a more detailed description of aspects of the present invention, FIG. 1 depicts a schematic diagram of an atomic force microscope (AFM) tip in contact with a droplet of a sample fluid in contact with a solid surface while immersed in a second fluid according to one or more embodiments of the present invention. The diagram shows a system 100 for determining snap-off force of a fluid on a solid surface. The system 100 includes a controller (processor) 101 that controls operation of the AFM (not shown) and the AFM tip 102. The measurements taken by the AFM can be analyzed by the controller to make calculations for capillary forces and interfacial tension as described in greater detail below. In the system 100, a sample fluid 110 is deposited on a solid surface 120 while immersed in a second fluid 115. The system 100 also includes the AFM tip 102 which is attached to a cantilever (not shown) of the AFM. The AFM tip 102 is spherical in shape and includes a radius R. The AFM tip 102 is shown engaged with the sample fluid 110 that is in contact with the solid surface 120. The snap-off force F of the AFM tip is the sum of the force $F_S$ exerted by the solid surface and the force $F_C$ exerted by the fluid capillary, as shown in Equation [1]. By performing, via the controller 101 and AFM, a reference measurement where there is no capillary formation, i.e. $F=F_S$, the controller 101 can separate the contributions and determine the force components $F_S$ due to the solid surface and $F_C$ due to the capillary formation independently. For obtaining the interfacial tension (IFT) $\sigma$ of the sample fluid 110 while in contact with the solid surface 120 and immersed in the second fluid 115, equation [2] in FIG. 1 is utilized and the calculations are performed by the controller 101 using measurements from the AFM as controlled by the controller 101. Equation [2] depicts a variety of parameters including the IFT $\sigma$ which is the focus of the calculation. This equation [2] is utilized for sample fluids that are sized in the micron and sub-micron range while the sample fluid 110 and solid surface 120 are immersed in a second fluid 115. In one or more embodiments of the present invention, the second fluid 115 can be in the form of either a gas or liquid. Through operation, by the controller 101, of the AFM and probing by the AFM tip 102, a set of parameters can be measured and/or calculated. In addition, the AFM tip 102 can be changed out so that the radius R can be adjusted or selected for further measuring/calculating the set of parameters for the sample fluid 110. The set of parameters that can be measured/calculated through operation, by the controller 101, of the AFM include capillary force $F_C$ exerted by the sample fluid 110 and that acts downwards on the AFM tip 102, height h of the AFM tip 102 measured as the shortest distance between the AFM tip 102 and the solid surface 120, interior contact angle $\theta_2$ between the surface of the sample fluid 110 and the solid surface 120 which can be measured directly by doing a line scan across the droplet profile through the center of the droplet, height $h_0$ of the AFM tip 102 when the AFM tip snaps off from the sample fluid 110, and the volume V of the sample fluid 110. Note that, in general, $\theta_1 \neq \theta_2$.

The remaining parameters in FIG. 1 can be derived by the controller 101 utilizing the equations from FIG. 2. All these parameters are necessary to describe the geometrical constraints of the system and ultimately allow the accurate calculation of the IFT between sample fluid 110 and sample fluid 115. Equation [2] correlates the capillary force $F_C$ and several geometrical and physical parameters of the system. A two-step procedure (described in greater detail below) is utilized to calculate the capillary force $F_C$, which is the left-hand side of Equation [2]. This procedure involves the integral of the instantaneous vertical force f(h) on the AFM tip 102 from an initial starting height of 0 to the height $h_0$ where the AFM tip 102 snaps off from the sample fluid 110, divided by this snap-off height $h_0$, as shown in Equation [3]. By taking the difference of the result obtained in the capillary system and in a reference system without capillary formation, the $F_S$ component (see Equation [1]) cancels out and we are left with $F_C$. The only two parameters that the AFM cannot measure accurately are the angle parameters of $\alpha$ and $\theta_1$. While $\theta_1$ is constant for a given combination of droplet of sample fluid 110 and AFM tip 102 material, $\alpha(h)$ changes as h increases from 0 to $h_0$. $\alpha_0 = \alpha(h_0)$ is the value $\alpha$ takes when the AFM tip 102 snaps off from the sample fluid 110. Also, these parameters cannot be accurately calculated utilizing any of the equations from FIG. 1 or 2, as there are more unknown variables than there are independent equations.

According to one or more embodiments of the present invention, to obtain more accurate parameters for the angle parameters of $\alpha_0$ and $\theta_1$, a series of measurements are taken utilizing AFM tips 102 of varying radii R. For each $F_C$ and known R, the value of $F_C$ calculated by utilizing equations from FIGS. 1 and 2 will only coincide with the measured value of $F_C$ if correct values of $\alpha_0$, $\theta_1$ and IFT $\sigma$ are utilized. An expression of the capillary force $F_C$ versus radius R can be adjusted, using curve-fitting methods such as least-squares regression, to the series of measurements to obtain values for $\alpha$, $\theta_1$ and $\sigma$ that best describe the data points. Thus, IFT $\sigma$ can be more precisely calculated for the sample fluid 110 on the solid surface 120 while immersed in the second fluid 115. The expressions that correlates Fc and R are derived in FIGS. 1 and 2, however, some required parameters cannot be measured directly (as explained above). In order to overcome this problem, aspects of the invention perform multiple measurements by the AFM as controlled by the controller 101 where each measurement is performed with an AFM tip having a different radius R (as described below). For each radius R, the measurement will provide the corresponding Fc. A table containing several Fc vs. R pairs is built and curve-fitting methods, performed by the controller 101, are utilized to adjust the value of the unknown parameters $\alpha_0$, $\theta 1$ and $\sigma$ of the analytical expression to the experimental data points.

Figure 3A:
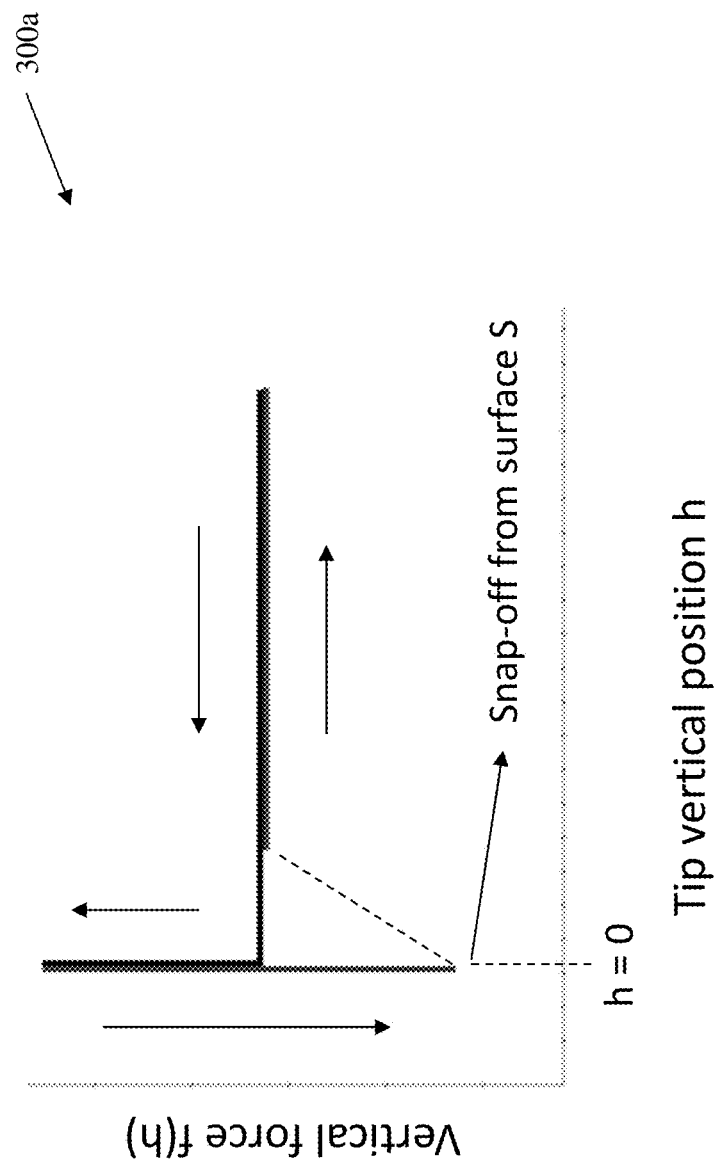
FIG. 3a depicts an exemplary force distance curve according to one or more embodiments of the present invention.

In one or more embodiments of the present invention, the capillary force $F_C$ is calculated utilizing equation [2] in FIG. 1. The $F_C$ is calculated using measurements taken in two scenarios. The first scenario is to obtain measurements from the AFM for when the solid surface 120 is immersed in the sample fluid 110 (i.e., reference system without capillary formation). An exemplary force distance curve is shown in FIG. 3a. FIG. 3a depicts a graph 300a of the force-distance curve measurement by the AFM for a sample fluid 110 in contact with a solid surface according to one or more embodiments of the invention. The graph 300a depicts the vertical force f(h) exerted on the AFM tip 102 versus the vertical position h of the AFM tip 102 as measured from a center point in the AFM tip 102 (as shown in FIG. 1). The graph 300a shows the snap-off vertical force is observed at the snap-off vertical position $h_0=0$. The snap-off force is the force that must be exerted on the AFM tip 102 to free the AFM tip 102 from the attractive forces between the AFM tip 102 and the surface 120 and is labelled as $F_S$. By knowing physical properties of the AFM cantilever, the force exerted on the AFM tip 102 can be calculated from the recordings of the deflection of the cantilever by any known means. A snap-off event is observed as an instantaneous change in the cantilever deflection. $F_S$ represents the force exerted by the surface 120 when immersed in the sample fluid 110.

Figure 3B:
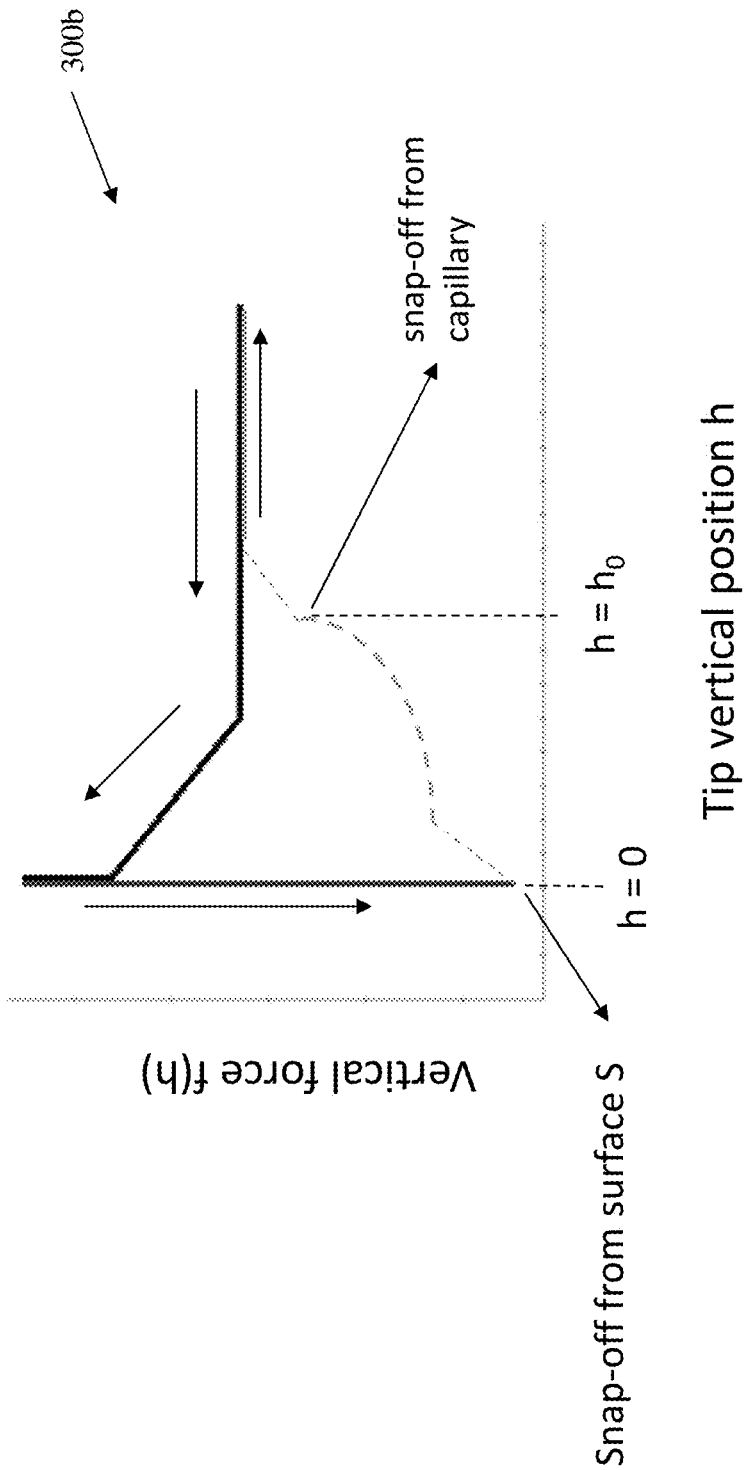
FIG. 3b depicts an exemplary force distance curve according to one or more embodiments of the present invention.

In the second scenario, measurements by the AFM are taken for when the sample fluid 110 is deposited as a droplet on the solid surface 120 while both the sample fluid 110 droplet and the solid surface 120 are immersed in a second fluid 115. The second fluid 115 in gaseous form can be a different material from the second fluid 115 when in liquid form. An exemplary force distance curve for this scenario is shown in FIG. 3b. The graph 300b includes the vertical force f(h) exerted on the AFM tip 102 and the snap-off force is measured showing the snap-off vertical position $h_0$ of the AFM tip 102. The snap-off force measured in the second scenario may be a combination of the force $F_S$ due to the solid and the force $F_C$ due to the capillary bridge. The capillary force $F_C$ can be calculated by taking the difference between the two snap-off forces in the first and second scenarios. The snap-off force is calculated as the integral of the instantaneous vertical force f(h) divided by $h_0$, as shown in Equation [3]. The difference of the snap-off force calculated in the first (reference) scenario (without a droplet) and the snap-off force calculated in the second scenario (with a droplet) is taken to cancel out the $F_S$ component of Equation [1] and obtain the capillary force $F_C$.

Figure 4:
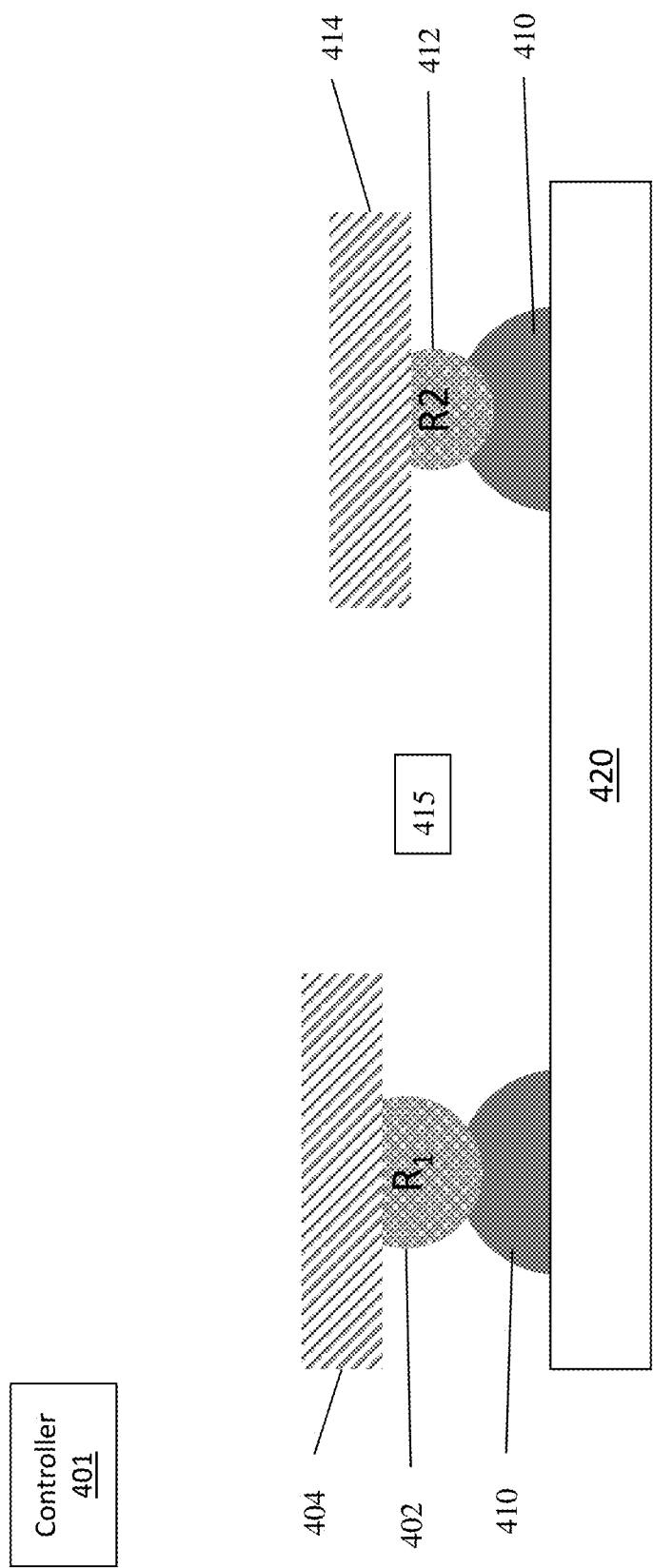
FIG. 4 depicts a block diagram of AFM tips of varying radii measuring sample fluid droplets according to one or more embodiments of the present invention.

In one or more embodiments of the present invention, the above described two measurement steps can be repeated to calculate the capillary force $F_C$ using different AFM tips having different radii R. FIG. 4 depicts a block diagram of AFM tips of varying radii measuring sample fluid droplets according to one or more embodiments of the present invention. As shown in FIG. 4, a sample fluid 410 is deposited on the solid surface 420 as a droplet having a volume V. The sample fluid 410 can be deposited on the solid surface 420 using any known means. A first AFM tip 402 having a radius of $R_1$ is utilized to obtain the measurements described above to calculate the capillary force $F_C$ while using AFM tip 402 with radius $R_1$. The capillary force $F_C$ measured/calculated utilizing the AFM tip 402 with radius $R_1$ is recorded. AFM tip 402 is attached to cantilever 404 which is attached to the AFM (not shown). The AFM is controlled by the controller 401. The controller 401 performs the calculations described herein utilizing measurements taken from the AFM. During these measurements, the sample fluid 410 and the solid surface 420 are immersed in a second fluid 415 either in gaseous or liquid phase depending on the measurement scenarios. The second fluid 415 in gaseous form can be a different material when in liquid form. The same measurements are obtained utilizing a second AFM tip 412 attached to a cantilever 414 and having a new radius of $R_2$. The sample fluid 410 remains the same and the droplet of the sample fluid 410 has the same or substantially the same volume V. These measurements are taken while both the solid surface 420 and the sample fluid 410 are immersed in the second fluid 415 in either gaseous or liquid phase. This process can be repeated multiple times with AFM tips of varying radii and the capillary forces are stored along with the associated radii of the AFM tips used to measure these forces.

In one or more embodiments of the present invention, an expression of the capillary force $F_C$ versus radius R can be fit to the series of measurements to obtain values for $\alpha$ and $\theta_1$ and, thus, IFT $\sigma$ can be more precisely calculated for the sample fluid on the solid surface while immersed in the second fluid. The IFT is calculated utilizing the equations from FIG. 1 and FIG. 2, according to which the volume V of the sample fluid 110 is a function of only h, R, $\theta_1$, $\theta_2$ and $\alpha$. In other words, $\theta_1$ is a function of V, h, R, $\theta_2$ and $\alpha$, while $\alpha$ is a function of V, h, R, $\theta_1$ and $\theta_2$. Therefore, the force f(h) is a function of V, h, R, $\theta_1$, $\theta_2$, $\alpha$ and the IFT $\sigma$. Similarly, the force $F_C$ is a function of V, $h_0$, R, $\theta_1$, $\theta_2$, $\alpha_0$ and $\sigma$. It is then possible to calculate the values of $\theta_1$, $\alpha$ and $\sigma$ so that not only the calculated values of f(h) as h increases from 0 to $h_0$ equal the experimentally obtained values of f(h) as h increases from 0 to $h_0$ for each radius R of the AFM tip, but also the measured values of $F_C$ equal the experimentally obtained values of $F_C$ for each radius R of AFM tip.

Figure 5:
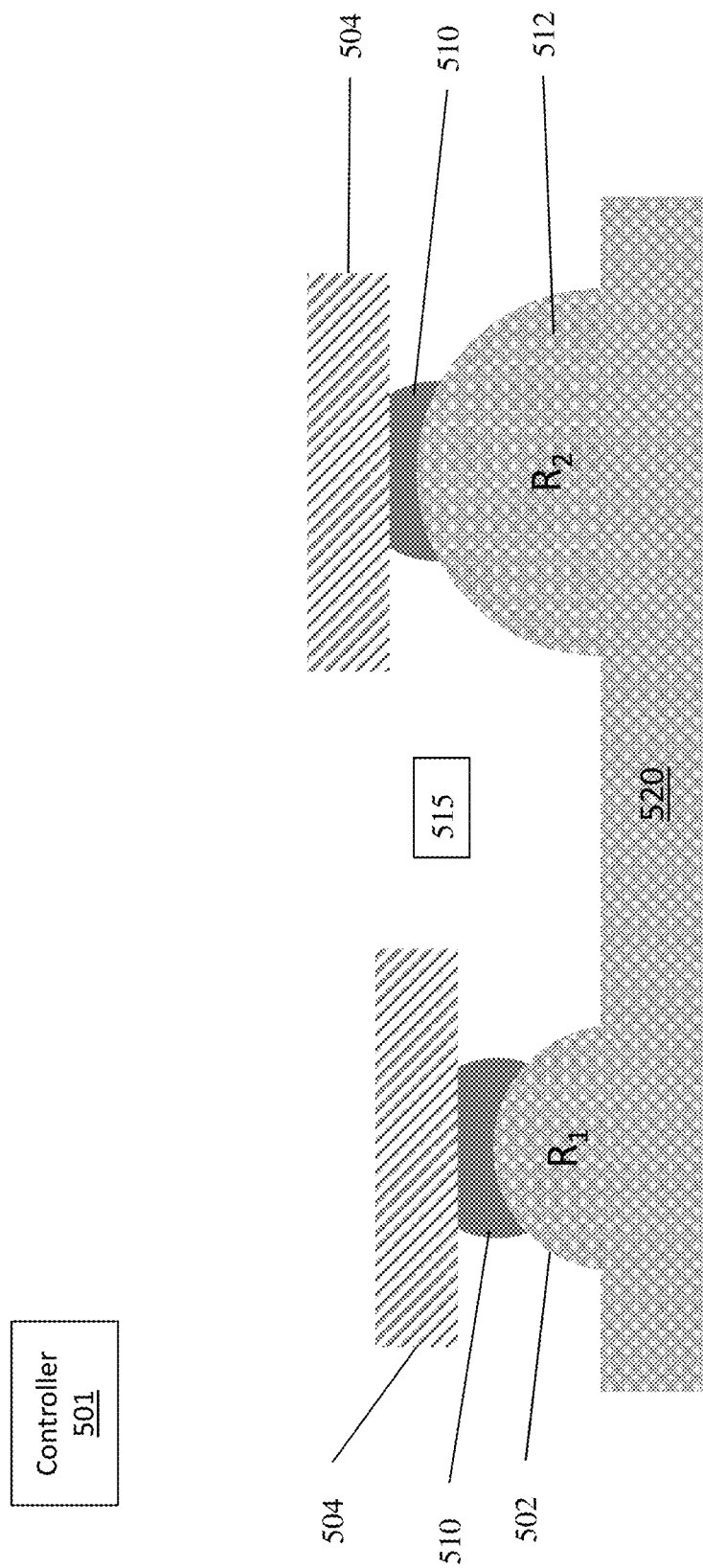
FIG. 5 depicts a block diagram of a patterned solid surface having sample fluid droplets deposited on the patterned surface according to one or more embodiments of the present invention.

In one or more embodiments of the present invention, instead of varying the radii of AFM tips when obtaining measurements, the solid surface can be patterned with spherical or colloidal protrusions that have varying radii to measure the capillary forces of a sample fluid on the patterned solid surface while immersed in a second fluid (either gas or liquid phase). FIG. 5 depicts a block diagram of a patterned solid surface having sample fluid droplets deposited on the patterned surface according to one or more embodiments of the present invention. The patterned surface 520 includes two protrusions 502 and 512 having radii of $R_1$ and $R_2$, respectively. For a first set of measurements, a sample fluid 510 droplet is deposited on the first protrusion 502 while both are immersed in a second fluid 515 (either gas or liquid phase depending on the measurements being performed). A tip-less (planar) cantilever 504 attached to an AFM is then utilized to measure the capillary force from a retraction curve. The AFM is controlled by a controller 501 and any calculations described herein can be performed by the controller 501 utilizing measurements taken by the AFM. This process can be repeated utilizing the second spherical protrusion 512 having a different radius $R_2$. Here, the snap-off force is measured using the tip-less (planar) cantilever 504 attached to the AFM for a sample fluid 510 droplet deposited on the second protrusion 512 while immersed in the second fluid 515. As mentioned above, an expression of the capillary force $F_C$ versus radii R can be adjusted using curve-fitting methods such as least-squares regression to the series of measurement data points to obtain values for $\alpha_0$ and $\theta_1$ and, thus, IFT $\sigma$ can be more precisely calculated for the sample fluid on the solid surface while immersed in the second fluid.

Technical benefits for this system and methods for determining interfacial tension of a fluid immersed in a second fluid on a solid surface include the fact that the material utilized for the cantilever/AFM tip can be a different material than that used for the solid surface. As mentioned before, previous works had to assume the value of either $\alpha$ or $\theta_1$ to calculate the IFT $\sigma$. Many models assume the value of $\theta_1$ by making it equal to $\theta_2$. For this to be true, however, the cantilever/AFM tip and the solid surface must be made of the same material, which limits the kinds of cantilevers/AFM tips that can be used and/or the kinds of solid surfaces that can be probed. Since the present invention does not require such assumptions, it is not hindered by such limitations.

Figure 6:
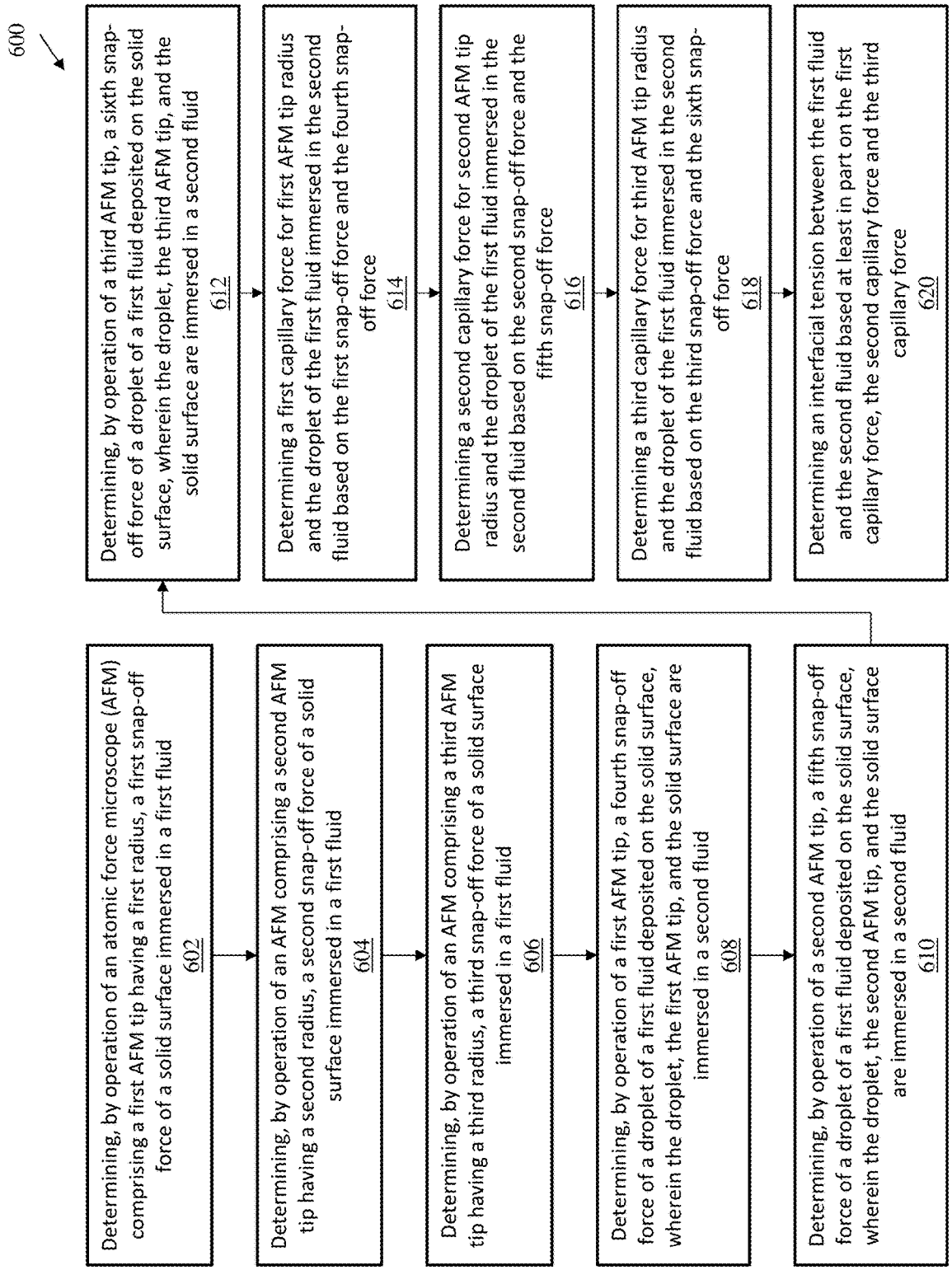
FIG. 6 depicts a flow diagram of a method for determining interfacial tension in fluid-fluid-solid systems according to one or more embodiments of the invention.

FIG. 6 depicts a flow diagram of a method for determining interfacial tension in fluid-fluid-solid systems according to one or more embodiments of the invention. The method 600 includes determining, by a processor (e.g., the computer system 800 shown in FIG. 8) operating an atomic force microscope (AFM) comprising a first AFM tip having a first radius, a first snap-off force of a solid surface immersed in a first fluid, as shown in block 602. At block 604, the method 600 includes determining, by the processor operating the AFM comprising a second AFM tip having a second radius, a second snap-off force of the solid surface immersed in the first fluid. The method 600, at block 606, includes determining, by the processor operating the AFM comprising a third AFM tip having a third radius, a third snap-off force of the solid surface immersed in the first fluid. And at block 608, the method 600 includes determining, by the processor operating the first AFM tip, a fourth snap-off force of a first droplet of the first fluid deposited on the solid surface, wherein the first droplet, the first AFM tip, and the solid surface are immersed in a second fluid. At block 610, the method 600 continues with determining, by the processor operating the second AFM tip, a fifth snap-off force of the first droplet of the first fluid deposited on the solid surface, wherein the first droplet, the second AFM tip, and the solid surface are immersed in the second fluid. Also, at block 612, the method 600 includes determining, by the processor operating the third AFM tip, a sixth snap-off force of the first droplet of the first fluid deposited on the solid surface, wherein the first droplet, the third AFM tip, and the solid surface are immersed in the second fluid. At block 614, the method 600 includes determining, by the processor, a first capillary force for the first AFM tip and the first droplet of the first fluid immersed in the second fluid based on the first snap-off force and the fourth snap-off force. Also, at block 616, the method 600 continues with determining, by the processor, a second capillary force for the second AFM tip and the first droplet of the first fluid immersed in the second fluid based on the second snap-off force and the fifth snap-off force. The method 600, at block 618, also includes determining, by the processor, a third capillary force for the third AFM tip and the first droplet of the first fluid immersed in the second fluid based on the third snap-off force and the sixth snap-off force. And at block 620, the method 600 includes determining, by the processor, an interfacial tension between the first fluid and the second fluid based at least in part on the first capillary force, the second capillary force, and the third capillary force.

Additional processes may also be included. It should be understood that the processes depicted in FIG. 6 represent illustrations, and that other processes may be added or existing processes may be removed, modified, or rearranged without departing from the scope and spirit of the present invention.

Figure 7:
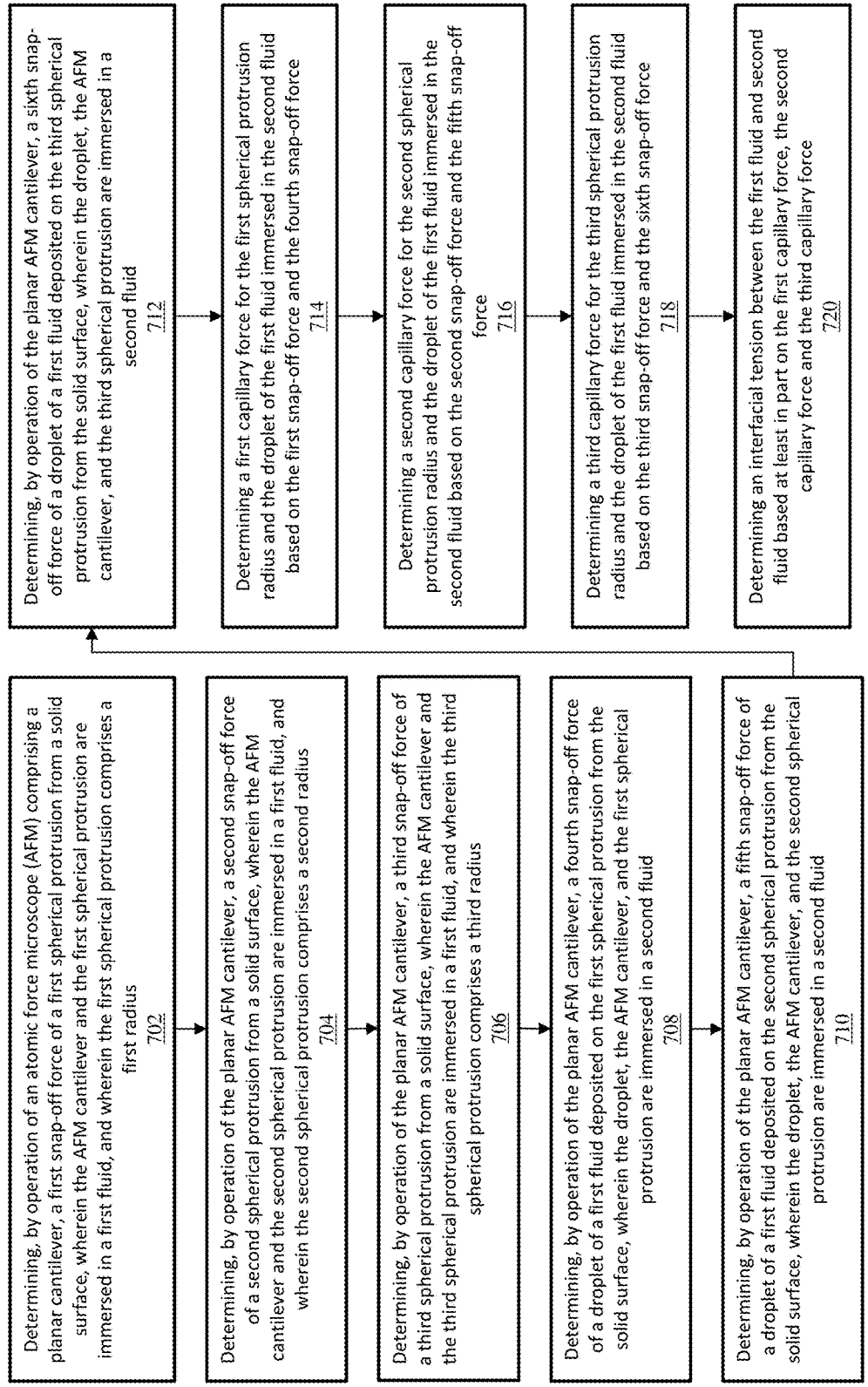
FIG. 7 depicts a flow diagram of a method for determining interfacial tension in fluid-fluid-solid systems according to one or more embodiments of the invention.

FIG. 7 depicts a flow diagram of a method for determining interfacial tension in fluid-fluid-solid systems according to one or more embodiments of the invention. The method 700 includes determining, by a processor operating an atomic force microscope (AFM) comprising a planar AFM cantilever, a first snap-off force of a first spherical protrusion from a solid surface, wherein the AFM cantilever and the first spherical protrusion are immersed in a first fluid, and wherein the first spherical protrusion comprises a first radius, at block 702. Also, at block 704, the method 700 includes determining, by the processor operating the planar AFM cantilever, a second snap-off force of a second spherical protrusion from a solid surface, wherein the AFM cantilever and the second spherical protrusion are immersed in a first fluid, and wherein the second spherical protrusion comprises a second radius. Continuing at block 706, the method 700 includes determining, by the processor operating the planar AFM cantilever, a third snap-off force of a third spherical protrusion from a solid surface, wherein the AFM cantilever and the third spherical protrusion are immersed in a first fluid, and wherein the third spherical protrusion comprises a third radius. The method 700 then includes determining, by the processor operating the planar AFM cantilever, a fourth snap-off force of a droplet of the first fluid deposited on the first spherical protrusion from the solid surface, wherein the droplet, the AFM cantilever, and the first spherical protrusion are immersed in a second fluid, as shown at block 708. Also, at block 710, the method 700 includes determining, by the processor operating the planar AFM cantilever, a fifth snap-off force of a droplet of a first fluid deposited on the second spherical protrusion from the solid surface, wherein the droplet, the AFM cantilever, and the second spherical protrusion are immersed in a second fluid. Then, at block 712, the method 700 includes determining, by the processor operating the planar AFM cantilever, a sixth snap-off force of a droplet of a first fluid deposited on the third spherical protrusion from the solid surface, wherein the droplet, the AFM cantilever, and the third spherical protrusion are immersed in a second fluid. The method 700 includes determining, by the processor, a first capillary force for the first spherical protrusion radius and the droplet of the first fluid immersed in the second fluid based on the first snap-off force and the fourth snap-off force, as shown at block 714. At block 716, the method 700 includes determining, by the processor, a second capillary force for the second spherical protrusion radius and the droplet of the first fluid immersed in the second fluid based on the second snap-off force and the fifth snap-off force. The method 700 also includes determining, by the processor, a third capillary force for the third spherical protrusion radius and the droplet of the first fluid immersed in the second fluid based on the third snap-off force and the sixth snap-off force. And at block 720, the method 700 includes determining, by the processor, an interfacial tension between the first fluid and second fluid based at least in part on the first capillary force, the second capillary force and the third capillary force.

Additional processes may also be included. It should be understood that the processes depicted in FIG. 7 represent illustrations, and that other processes may be added or existing processes may be removed, modified, or rearranged without departing from the scope and spirit of the present invention.

Figure 8:
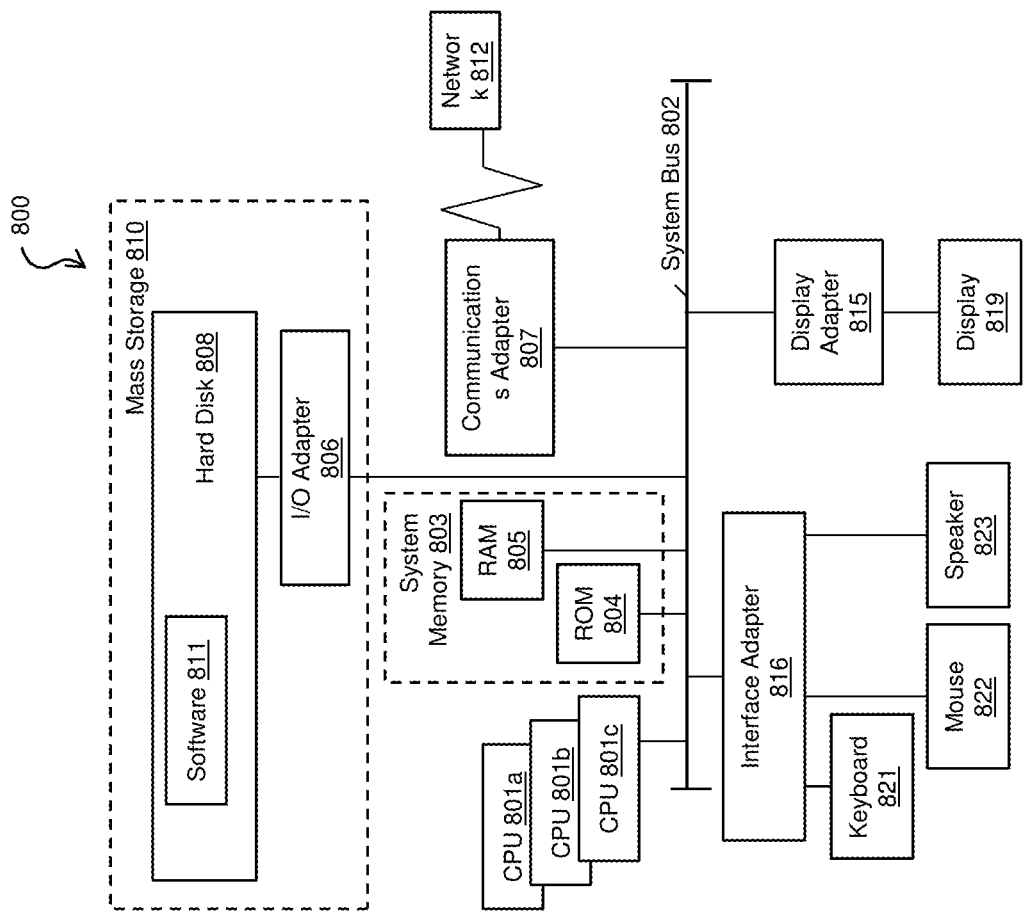
FIG. 8 depicts a block diagram of a computer system for use in implementing one or more embodiments of the present invention.

In one or more embodiments of the present invention, the controllers 101, 401, and 501 and any of the hardware/software modules and determinations, calculations, and measurements described in reference to the figures can be implemented on the processing system 800 found in FIG. 8.

Turning now to FIG. 8, a computer system 800 is generally shown in accordance with an embodiment. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 800 has one or more central processing units (CPU(s)) 801a, 801b, 801c, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is readwrite memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein below with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS or AIX operating system from IBM Corporation, to coordinate the functions of the various components shown in FIG. 8.

Additional input/output devices are shown as connected to the system bus 802 via a display adapter 815 and an interface adapter 816. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and, storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 8 is not intended to indicate that the computer system 800 is to include all of the components shown in FIG. 8. Rather, the computer system 800 can include any appropriate fewer or additional components not illustrated in FIG. 8 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    using a processor to control an atomic force microscope (AFM) to make determinations;
    wherein the AFM comprises:
        a first AFM tip having a first radius;
        a second AFM tip having a second radius; and
        a third AFM tip having a third radius; and
    wherein the determinations include:
        determining, by the processor operating the first AFM tip, a first snap-off force of a solid surface immersed in a first fluid;
        determining, by the processor operating the second AFM tip, a second snap-off force of the solid surface immersed in the first fluid;
        determining, by the processor operating the third AFM tip, a third snap-off force of the solid surface immersed in the first fluid;
        determining, by the processor operating the first AFM tip, a fourth snap-off force of a first droplet of the first fluid deposited on the solid surface, wherein the first droplet, the first AFM tip, and the solid surface are immersed in a second fluid;
        determining, by the processor operating the second AFM tip, a fifth snap-off force of the first droplet of the first fluid deposited on the solid surface, wherein the first droplet, the second AFM tip, and the solid surface are immersed in the second fluid;
        determining, by the processor operating the third AFM tip, a sixth snap-off force of the first droplet of the first fluid deposited on the solid surface, wherein the first droplet, the third AFM tip, and the solid surface are immersed in the second fluid;
        determining, by the processor, a first capillary force for the first AFM tip and the first droplet of the first fluid immersed in the second fluid based on the first snap-off force and the fourth snap-off force;
        determining, by the processor, a second capillary force for the second AFM tip and the first droplet of the first fluid immersed in the second fluid based on the second snap-off force and the fifth snap-off force;
        determining, by the processor, a third capillary force for the third AFM tip and the first droplet of the first fluid immersed in the second fluid based on the third snap-off force and the sixth snap-off force; and
        determining, by the processor, an interfacial tension between the first fluid and the second fluid based at least in part on the first capillary force, the second capillary force, and the third capillary force.

2. The computer-implemented method of claim 1, wherein:
    the second fluid comprises a gas; and
    the first fluid comprises a liquid.

3. The computer-implemented method of claim 1, wherein:
    determining the first capillary force comprises taking the difference between the first snap-off force and the fourth snap-off force;
    determining the second capillary force comprises taking the difference between the second snap-off force and the fifth snap-off force;
    determining the third capillary force comprises taking the difference between the third snap-off force and the sixth snap-off force.

4. The computer-implemented method of claim 1, wherein:
    determining the interfacial tension between the first fluid and the second fluid based at least in part on the first capillary force, the second capillary force and the third capillary force comprises:
        determining a mathematical expression for the first capillary force, the second capillary force and the third capillary force versus the first radius, the second radius and the third radius;

determining at least one parameter for the first fluid and the second fluid from the mathematical expression; and calculating the interfacial tension utilizing the at least one parameter.

5. The computer-implemented method of claim 1, wherein the first AFM tip is attached to a cantilever of the AFM.

6. The computer-implemented method of claim 1, wherein:
the first AFM tip comprises a first material; and
the solid surface comprises a second material.

7. The computer-implemented method of claim 1, wherein a size of the first droplet of the first fluid is micrometric or sub-micrometric.

8. A system comprising:
a processing circuit configured to operate an atomic force microscope (AFM), the AFM comprising a first AFM tip having first radius, a second AFM tip having a second radius, and a third AFM tip having a third radius;
wherein the processing circuit is further configured to:
determine, by operation the first AFM tip, a first snap-off force of a solid surface immersed in a first fluid;
determine, by operation of the second AFM tip, a second snap-off force of the solid surface immersed in the first fluid;
determine by operation of the third AFM tip, a third snap-off force of the solid surface immersed in the first fluid;
determine, by operation of the first AFM tip, a fourth snap-off force of a first droplet of the first fluid deposited on the solid surface, wherein the first droplet, the first AFM tip, and the solid surface are immersed in a second fluid;
determine, by operation of the second AFM tip, a fifth snap-off force of the first droplet of the first fluid deposited on the solid surface, wherein the first droplet, the second AFM tip, and the solid surface are immersed in the second fluid;
determine, by operation of the third AFM tip, a sixth snap-off force of the first droplet of the first fluid deposited on the solid surface, wherein the first droplet, the third AFM tip, and the solid surface are immersed in the second fluid;
determine a first capillary force for the first AFM tip radius and the first droplet of the first fluid immersed in the second fluid based on the first snap-off force and the fourth snap-off force;
determine a second capillary force for the second AFM tip radius and the first droplet of the first fluid immersed in the second fluid based on the second snap-off force and the fifth snap-off force;
determining a third capillary force for the third AFM tip radius and the first droplet of the first fluid immersed in the second fluid based on the third snap-off force and the sixth snap-off force; and
determine an interfacial tension between the first fluid and the second fluid based at least in part on the first capillary force, the second capillary force, and the third capillary force.

9. The system of claim 8, wherein:
the second fluid comprises a gas; and
the first fluid comprises a liquid.

10. The system of claim 8, wherein:
determining the first capillary force comprises taking the difference between the first snap-off force and the fourth snap-off force;
determining the second capillary force comprises taking the difference between the second snap-off force and the fifth snap-off force; and
determining the third capillary force comprises taking the difference between the third snap-off force and the sixth snap-off force.

11. The system of claim 8, wherein:
determining the interfacial tension between the first fluid and the second fluid based at least in part on the first capillary force, the second capillary force and the third capillary force comprises:
determining a mathematical expression for the first capillary force, the second capillary force and the third capillary force versus the first radius, the second radius and the third radius;
determining at least one parameter for the first fluid and the second fluid from the mathematical expression; and
calculating the interfacial tension utilizing the at least one parameter.

12. The system of claim 8, wherein the first AFM tip is attached to a cantilever of the AFM.

13. The system of claim 8, wherein:
the first AFM tip comprises a first material; and
the solid surface comprises a second material.

14. The system of claim 8, wherein a size of the first droplet of the first fluid is micrometric or sub-micrometric.

15. A computer-implemented method comprising:
using a processor to control an atomic force microscope (AFM) to make determinations, wherein the AFM comprises a planar AFM cantilever; and
wherein the determinations include:
determining, by a processor operating the planar AFM cantilever, a first snap-off force of a first spherical protrusion from a solid surface, wherein the AFM cantilever and the first spherical protrusion are immersed in a first fluid, and wherein the first spherical protrusion comprises a first radius;
determining, by the processor operating the planar AFM cantilever, a second snap-off force of a second spherical protrusion from a solid surface, wherein the AFM cantilever and the second spherical protrusion are immersed in a first fluid, and wherein the second spherical protrusion comprises a second radius;
determining, by the processor operating the planar AFM cantilever, a third snap-off force of a third spherical protrusion from a solid surface, wherein the AFM cantilever and the third spherical protrusion are immersed in a first fluid, and wherein the third spherical protrusion comprises a third radius;
determining, by the processor operating the planar AFM cantilever, a fourth snap-off force of a droplet of the first fluid deposited on the first spherical protrusion from the solid surface, wherein the droplet, the AFM cantilever, and the first spherical protrusion are immersed in a second fluid;
determining, by the processor operating the planar AFM cantilever, a fifth snap-off force of a droplet of a first fluid deposited on the second spherical protrusion from the solid surface, wherein the droplet, the AFM cantilever, and the second spherical protrusion are immersed in a second fluid;

determining, by the processor operating the planar AFM cantilever, a sixth snap-off force of a droplet of a first fluid deposited on the third spherical protrusion from the solid surface, wherein the droplet, the AFM cantilever, and the third spherical protrusion are immersed in a second fluid;

determining, by the processor, a first capillary force for the first spherical protrusion radius and the droplet of the first fluid immersed in the second fluid based on the first snap-off force and the fourth snap-off force;

determining, by the processor, a second capillary force for the second spherical protrusion radius and the droplet of the first fluid immersed in the second fluid based on the second snap-off force and the fifth snap-off force;

determining, by the processor, a third capillary force for the third spherical protrusion radius and the droplet of the first fluid immersed in the second fluid based on the third snap-off force and the sixth snap-off force; and determining, by the processor, an interfacial tension between the first fluid and second fluid based at least in part on the first capillary force, the second capillary force and the third capillary force.

16. The computer-implemented method of claim 15, wherein:
the second fluid comprises a gas; and
the first fluid comprises a liquid.

17. The computer-implemented method of claim 15, wherein:
determining the first capillary force comprises taking the difference between the first snap-off force and the fourth snap-off force;
determining the second capillary force comprises taking the difference between the second snap-off force and the fifth snap-off force; and
determining the third capillary force comprises taking the difference between the third snap-off force and the sixth snap-off force.

18. The computer-implemented method of claim 15, wherein:
determining the interfacial tension between the first fluid and the second fluid based at least in part on the first capillary force, the second capillary force and the third capillary force comprises:
determining a mathematical expression for the first capillary force, the second capillary force and the third capillary force versus the first radius, the second radius and the third radius;
determining at least one parameter for the first fluid and the second fluid from the mathematical expression; and
calculating the interfacial tension utilizing the at least one parameter.

19. The computer-implemented method of claim 15, wherein:
the AFM cantilever comprises a first material; and
the solid surface comprises a second material.

20. The computer-implemented method of claim 15, wherein a size of the first droplet of the first fluid is micrometric or sub-micrometric.

* * * * *